S. F. Hess,

Tobacco Package.

No. 3,871. Reissued Mar. 8, 1870.

Witnesses:

G. H. Clement

Wm. H. Loughborough

Inventor:

S. F. Hess

N. PETERS, PHOTO-LITHOGRAPHER, WASHINGTON, D. C.

UNITED STATES PATENT OFFICE.

SOLOMON F. HESS, OF ROCHESTER, NEW YORK.

IMPROVED PACKING-CASE FOR TOBACCO.

Specification forming part of Letters Patent No. 99,188, dated January 25, 1870; Reissue No. 3,871, dated March 8, 1870.

*To all whom it may concern:*

Be it known that I, SOLOMON F. HESS, of Rochester, in the county of Monroe and State of New York, have invented a certain new and Improved Package for Tobacco, of which the following is a specification.

It is well known that the present internal revenue laws require that tobacco shall be retailed from the original case or tub in which it is packed by the manufacturer, and also that such package shall be made of wood and not be used a second time for such purpose. Moreover, the weight of the contents of the package is restricted to ten or twenty pounds.

The object of my invention, the nature of which will be understood by reference to the specification and drawings, is to provide a small, cheap package, which can be readily opened or closed and may be used for other purposes after the tobacco is removed.

Figure 1:
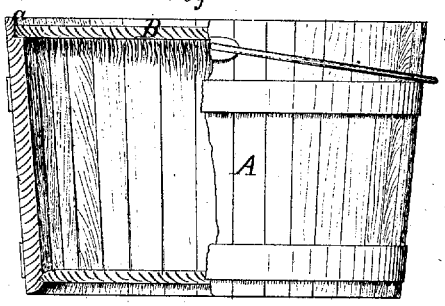
Figure 2:
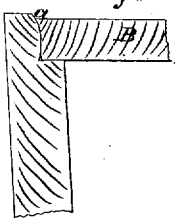

The main portion of the case A is constructed similarly to any tub or pail, having a bottom secured in a groove near the lower edge of the staves, and the whole bound together by light hoops. The upper hoop, *b*, is located some distance from the upper end of the staves, whereby the latter are allowed to spring outward slightly when the cover is pressed in. The cover B is turned to fit tightly within the "rabbet" *a*, formed upon the upper edge of the staves. For security, this rabbet may be a little deeper at the base, thus having a slight inward fullness near the end of the staves, and the edge of the cover may be concaved to fit, as shown in Fig. 2; but such construction is not necessary. When the cover is forced into the rabbet *a*, the staves are sprung outward, and by their pressure hold the cover securely without moving the hoop. For convenience in "entering" the cover, its edge may be beveled inward or slightly rounded at the lower corner.

It might be found desirable to dispense with the rabbet *a*, the cover being turned to fit within the staves and held by their pressure, as before.

By inserting a sharp instrument under or into the edge of the cover it may be easily removed. It is evident that my invention may be used for other purposes than the one named, for which it is also valuable after the tobacco is removed. A bale may be cheaply attached to it, as shown, which will be found convenient in many cases.

What I claim as my invention, and desire to secure by Letters Patent, is—

As an improved article of manufacture, a cylindrical wooden tobacco-package, made substantially as set forth, and provided with a suitable detachable head, held in position by the spring of the staves, for the purpose set forth.

S. F. HESS.

Witnesses:

FRED. A. HATCH,

F. H. CLEMENT.